(12) United States Patent
Ebrahimi Afrouzi et al.

(10) Patent No.: US 10,254,403 B1
(45) Date of Patent: Apr. 9, 2019

(54) EDGE DETECTION SYSTEM

(71) Applicant: Bobsweep Inc., Toronto (CA)

(72) Inventors: Ali Ebrahimi Afrouzi, San Jose, CA (US); Soroush Mehrnia, Copenhagen (DK); Masih Ebrahimi Afrouzi, Berkeley, CA (US)

(73) Assignee: AI Incorporated (CA)

( * ) Notice: Subject to any disclaimer, the term of this patent is extended or adjusted under 35 U.S.C. 154(b) by 454 days.

(21) Appl. No.: 14/941,385

(22) Filed: Nov. 13, 2015

Related U.S. Application Data

(60) Provisional application No. 62/083,464, filed on Nov. 24, 2014.

(51) Int. Cl.
*G01C 1/00* (2006.01)
*G01S 17/06* (2006.01)
*G01S 15/06* (2006.01)

(52) U.S. Cl.
CPC .............. *G01S 17/06* (2013.01); *G01S 15/06* (2013.01); *G01C 1/00* (2013.01)

(58) Field of Classification Search
CPC ............ G01S 17/06; G01S 15/06; G01C 1/00
USPC ............................................................ 73/627
See application file for complete search history.

(56) References Cited

U.S. PATENT DOCUMENTS

| | | | | | |
|---|---|---|---|---|---|
| 5,440,216 | A | * | 8/1995 | Kim | A47L 5/28 15/319 |
| 5,497,529 | A | * | 3/1996 | Boesi | A47L 11/4044 15/319 |
| 5,940,927 | A | * | 8/1999 | Haegermarck | A47L 5/30 15/319 |
| 2013/0145572 | A1 | * | 6/2013 | Schregardus | A47L 11/4036 15/319 |
| 2014/0009748 | A1 | * | 1/2014 | Leonessa | G01C 3/08 356/4.03 |

* cited by examiner

*Primary Examiner* — Max H Noori
(74) *Attorney, Agent, or Firm* — STLG Law Firm; Soody Tronson

(57) ABSTRACT

A method for automated mobile devices to identify and avoid dangerous edges or drop-offs. Rangefinder sensors are installed on the underside of devices to calculate distances to the work surfaces. Distances are monitored for changes greater than a predetermined threshold. Distance changes greater than the threshold cause the device to execute methods or algorithms for avoiding the identified area.

3 Claims, 2 Drawing Sheets

EDGE DETECTION SYSTEM

CROSS-REFERENCE TO RELATED APPLICATIONS

This application claims the benefit of provisional patent application Ser. No. 62/083,464, filed Nov. 24, 2014 by the first named inventor.

FIELD OF INVENTION

The present invention relates to mobile automated devices, such as robotic floor cleaners. More particularly, the invention relates to methods for mobile automated devices to detect edges or drop-offs.

BACKGROUND OF INVENTION

The following is a tabulation of some prior art that presently appears relevant:

U.S. patent Documents

| Pat. No. | Kind Code | Issue Date | Patentee |
|---|---|---|---|
| 6,988,331 | B2 | Jan. 24, 2006 | Larry Holmberg |
| 8,087,117 | B2 | Jan. 3, 2012 | Irobot Corporation |
| 8,516,651 | B2 | Aug. 27, 2013 | Irobot Corporation |
| 7,801,645 | B2 | Sep. 21, 2010 | Sharper Image Acquisition Llc |
| 7,057,501 | B1 | Jun. 6, 2006 | Darryl Davis |
| 6,400,311 | B1 | Jun. 4, 2002 | Honeywell International Inc. |

U.S. patent application Publications

| Publication Nr | Kind Code | Publ. Date | Applicant |
|---|---|---|---|
| 20040204792 | A1 | Oct. 14, 2004 | Taylor Charles E., Parker Andrew J., et al. |
| 20040130685 | A1 | Jul. 8, 2004 | Lite-On technology Corporation |

Mobile automated devices are becoming increasingly common in consumer homes. These may include robotic vacuums, robotic mops, and other devices that move through environments autonomously. One problem that such devices face is effectively identifying dangerous drop-offs. Mobile automated devices are often unable to traverse stairs or ledges without damage, thus these and similar structures must be avoided. A need exists for a precise method to identify dangerous drop-offs and edges. A need exists for a method to differentiate between large edges that are dangerous and smaller elevation changes that are traversable.

SUMMARY OF INVENTION

It is a goal of the present invention to provide a precise method for identifying dangerous edges and drop-offs for mobile automated devices.

The present invention achieves the aforementioned goal by providing one or more rangefinder sensors on the underside of mobile automated devices. So positioned, rangefinder sensors calculate the distance from the bottom of the device to the nearest surface. This distance is continuously monitored during operation of the mobile automated device. A sudden increase beyond a predetermined threshold may be defined as a dangerous edge. Upon detecting a dangerous edge, the mobile automated device may be caused to employ methods or algorithms to drive away from the edge.

Any type of rangefinder sensor, such as laser rangefinder sensors, infrared rangefinder sensors, or ultrasonic rangefinder sensors, may be used.

DETAILED DESCRIPTION OF THE INVENTION

Figure 1:
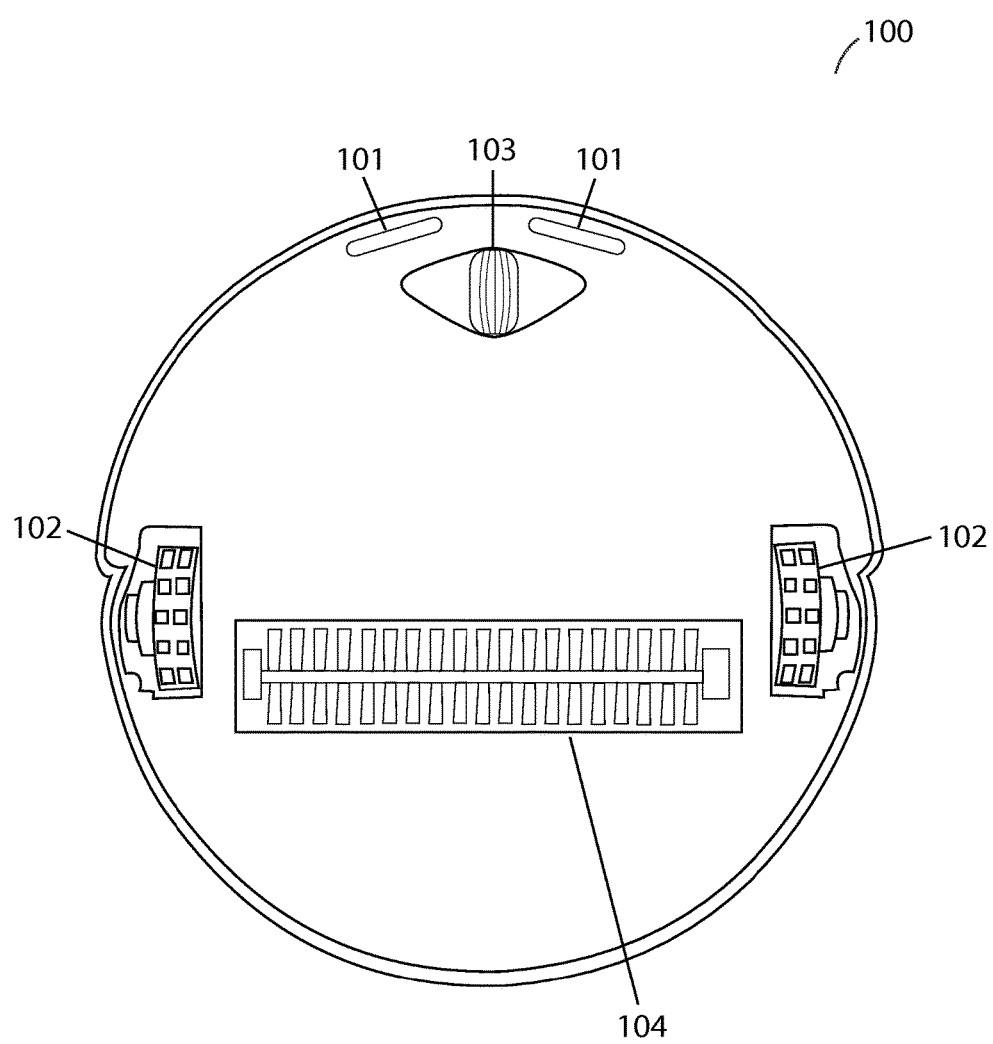
FIG. 1 illustrates an overhead view of the underside of a robotic vacuum provided with rangefinder sensors to detect edges embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Embodiments of the present invention introduce a method for identifying dangerous drop-offs or edges by mobile automated devices. The mobile automated device in this document is referred to as a robotic vacuum but edge identification methods disclosed herein are not limited to one type of mobile automated devices and may be utilized by any number of different types of automated devices that move autonomously through environments. For example, the proposed invention may also be used in robotic floor polishers, robotic lawn mowers, and unmanned ground vehicles. Thus, the usage or references to vacuuming is not intended to limit the scope of the invention, but rather serve as an illustrative example.

As understood herein, the terms "edge", "drop-off", "ledge", and "cliff" are used to refer to any vertical or very steep descent. In homes, a cliff may comprise a descending step or staircase, the edge of a table that a robotic device has been placed on, or any other drop-off.

As understood herein, the term "robotic vacuum" may be defined generally to include one or more autonomous devices having communication, mobility, vacuuming and/or processing elements. For example, a robotic vacuum may comprise a casing or shell, a chassis including a set of wheels, a motor to drive wheels, a receiver that acquires signals transmitted from, for example, a transmitting beacon, a processor, and/or controller that processes and/or controls motor and other robotic autonomous or cleaning operations, network or wireless communications, power management, etc., one or more clock or synchronizing devices, a vacuum motor to provide suction, a debris dustbin to store debris, a brush to facilitate collection of debris, and a means to spin the brush.

Generally, a method for mobile automated devices to identify dangerous edges using rangefinder sensors is proposed. One or more rangefinder sensors is positioned on the underside of a mobile automated device such that emitted signals are directed downward. Any available type of rangefinder sensor may be employed, including laser rangefinder sensors, infrared rangefinder sensors, or ultrasonic rangefinder sensors. The one or more rangefinder sensors calculate the distance from their location to the nearest surface in their line of sight. On uniform flat surfaces, this distance, representing the distance from the bottom of the device to the work surface, will remain substantially constant. Upon encountering a drop-off or cliff, the rangefinder sensors will detect a sudden increase in the distance to the nearest surface. A distance increase beyond a predetermined threshold may actuate the mobile automated device's methods for avoiding the area, which may include reversing, turning away, or other methods.

Rangefinder sensors themselves are well known in the art and the technology therein does not constitute part of the claimed matter, so a comprehensive description of the operation of rangefinder sensors is not provided. However, a general overview is provided to ensure basic understanding. Generally, rangefinder sensors simultaneously emit a signal and start a timer. When the signal reaches an obstacle, it bounces off and, in a second step, reflects back into a receiver. Receipt of a reflected signal stops the timer. Because the signals travel at a constant rate, the time elapsed between when a signal is sent and when it is received may be used to calculate the distance that the signal traveled, and thus the distance from the sensor to the reflecting surface.

Referring to FIG. 1, an overhead view of the underside of a robotic vacuum 100 is illustrated with a set of rangefinder sensors 101 installed along a portion of the periphery thereof. A robotic vacuum may also include driving wheels 102, a front wheel 103 for steering, and a cleaning apparatus 104. The positioning of rangefinder sensors may vary, however, in the preferred embodiment, rangefinder sensors are positioned substantially around a portion of (or all of) the periphery of the underside of the particular device in question so that, as the device is traveling in a forward direction, the rangefinder sensors may detect an edge before either any wheels of the device have traversed the edge, or the center of mass of the device has passed the edge.

Figure 2A:
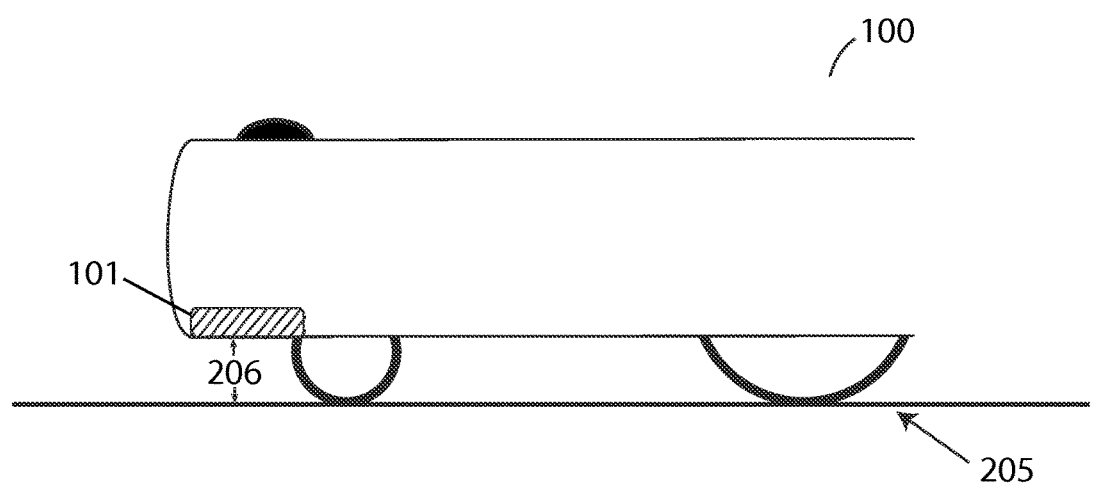
FIG. 2A illustrates the operation of rangefinder sensors in detecting that there is no edge embodying features of the present invention.

Referring to FIG. 2A, a side elevation view of a robotic vacuum 100 using rangefinder sensors 101 over a surface 205 with no edges is illustrated. The rangefinder sensors 101 continuously calculate the distance 206 from their location to the nearest surface, which is typically the work surface 205. (The nearest surface could be an item positioned on top of the work surface that the device has driven over.) The rangefinder sensors are electrically coupled with a processor of the device (not shown), which monitors the calculated distances. Positive changes in the distance greater than a predetermined amount may trigger the device's methods for avoiding an area. In the example shown in FIG. 2A, no positive change is detected (indicating that no edges have been identified) and the device continues operation as normal.

Figure 2B:
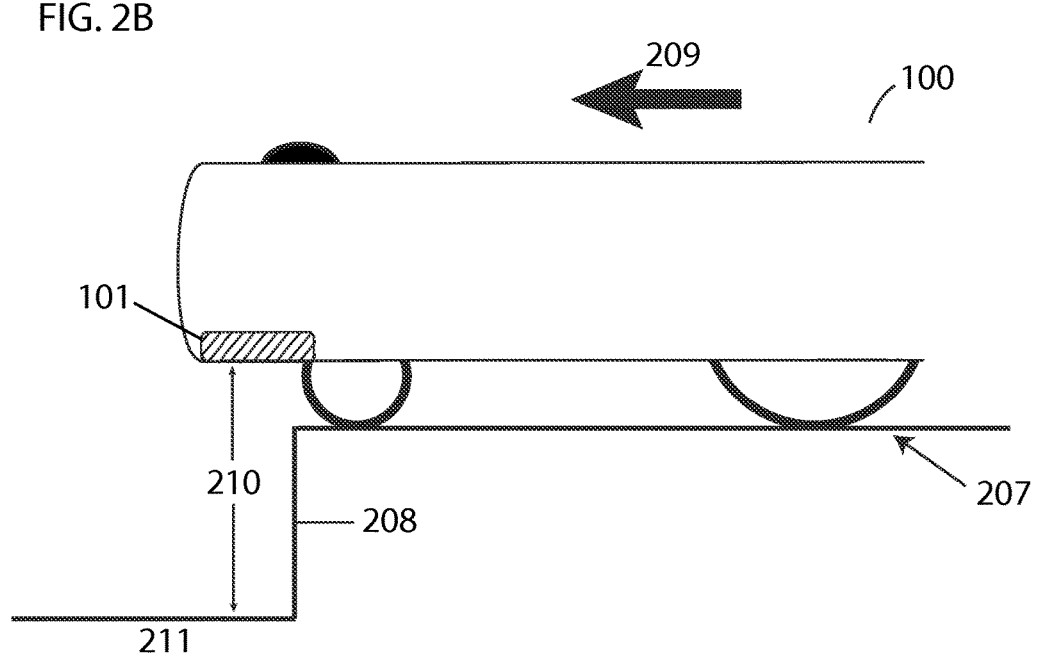
FIG. 2B illustrates the operation of rangefinder sensors in detecting a dangerous edge embodying features of the present invention.

Referring to FIG. 2B, a side elevation view of a robotic vacuum 100 using rangefinder sensors 101 over a surface 207 with an edge 208 is illustrated. In this case, the robotic vacuum moved in a direction 209 to arrive at the current location where the distance 210 from the rangefinder sensor 101 to the nearest surface 211 is significantly greater than before. The increase in distance may be greater than a predetermined amount and trigger the device's methods for avoiding the area, thereby stopping the device from falling off the edge.

Methods and algorithms for avoiding areas (such as cliffs) are not part of the scope of the invention, so a detailed description thereof is not included herein. Methods for avoiding areas are defined as any methods or algorithms employed to drive a mobile device away from a particular area. These methods may include turning 360 degrees and driving in the opposite direction, reversing, turning a small amount and then continuing, etc.

We claim:

1. An autonomous cleaning apparatus, comprising:
   a chassis;
   a drive system installed in the chassis operable to enable movement of the cleaning apparatus, the drive system comprising a set of wheels;
   a control system in communication with the drive system including a processor operable to control the drive system to provide at least one movement pattern of the cleaning apparatus;
   a cleaning assembly including a rotatable brush and an intake area;
   an impeller to provide suction to collect debris;
   a debris holding container;
   a battery to provide power to the system; and
   one or more downward-oriented rangefinder sensors positioned on the underside of said chassis and electrically coupled with the processor to calculate distances from the sensor to the work surface, wherein
   the distances calculated by each of the one or more rangefinder sensors are monitored by the processor, wherein
   changes in distance larger than a predetermined amount causes the control system to execute one or more predetermined movement patterns to avoid an area associated with the change in distance.

2. The autonomous cleaning apparatus of claim 1 wherein rangefinder sensors utilize any of: ultrasonic waves, laser beams, and infrared beams to calculate distances.

3. The autonomous cleaning apparatus of claim 1 in which said rangefinder sensors are positioned substantially along all or a portion of the periphery of the underside of the autonomous cleaning apparatus.

* * * * *